United States Patent [19]

Rue et al.

[11] Patent Number: 4,944,773

[45] Date of Patent: Jul. 31, 1990

[54] BONDED ABRASIVE TOOLS WITH COMBINATION OF FINELY MICROCRYSTALLINE ALUMINOUS ABRASIVE AND A SUPERABRASIVE

[75] Inventors: Charles V. Rue, Petersham; Leonard G. Pukaite, West Boylsten; Krishnamoorthy Subramanian, Groton, all of Mass.

[73] Assignee: Norton Company, Worcester, Mass.

[21] Appl. No.: 243,284

[22] Filed: Sep. 9, 1988

Related U.S. Application Data

[63] Continuation-in-part of Ser. No. 95,781, Sep. 14, 1987, abandoned.

[51] Int. Cl.$^5$ ............................................. B24D 3/04
[52] U.S. Cl. ..................................... 51/307; 51/309; 51/295; 51/298
[58] Field of Search ............. 51/307, 309, 293, 206 R, 51/209 R, 295 R

[56] References Cited

U.S. PATENT DOCUMENTS

| | | | |
|---|---|---|---|
| 2,979,414 | 4/1961 | Ryshkewitch et al. | 51/309 |
| 3,437,468 | 4/1969 | Seufert | 51/309 |
| 3,940,276 | 2/1976 | Wilson | 51/309 |
| 3,944,398 | 3/1976 | Bell | 51/307 |
| 4,314,827 | 2/1982 | Leitheiser et al. | 51/309 |
| 4,543,107 | 9/1985 | Rue | 51/308 |
| 4,623,364 | 11/1986 | Cottringer et al. | 51/309 |
| 4,741,743 | 5/1988 | Narayanan et al. | 51/309 |

*Primary Examiner*—Robert Rose
*Attorney, Agent, or Firm*—David Bennett

[57] ABSTRACT

Bonded abrasive grinding tools with more cost effective grinding performance than those known in the prior art for grinding certain types of hard metals may be made by combining in the tool both grits of conventional superabrasives and grits of aluminous abrasive characterized by a microstructure that predominantly comprises tightly packed, very fine crystals of alpha alumina or of an aluminum spinel such as magnesium aluminate. The predominant crystallites in the best type of aluminous abrasive have maximum dimensions of no more than about 0.3 micron and generally show little or no regular faceting at about 5,000 magnification and are approximately equiaxed, with no higher aspect ratio than 2, usually less than 1.5.

19 Claims, No Drawings

BONDED ABRASIVE TOOLS WITH COMBINATION OF FINELY MICROCRYSTALLINE ALUMINOUS ABRASIVE AND A SUPERABRASIVE

CROSS REFERENCE TO RELATED APPLICATION

This application is a continuation-in-part of application Ser. No. 95,781 filed Sept. 14, 1987, now abandoned.

TECHNICAL FIELD

This invention relates to bonded abrasive tools, particularly grinding wheels, comprising generally discrete, size graded abrasive grits mixed with a distinct continuous bonding material such as a glass, a cured resin, or a metal. Some of the abrasive grits are of one of the materials known as a "superabrasive", such as diamond, cubic boron nitride ("CBN"), or the like. The diamond and CBN may be either monocrystalline or polycrystalline. Superabrasives are both significantly harder and significantly more expensive than such conventional abrasives as alumina, zirconia-alumina, and silicon carbide.

TECHNICAL BACKGROUND

Superabrasives generally cost about one thousand times as much per unit volume as other conventional abrasives but nevertheless are cost effective in grinding certain materials such as tool steels. Superabrasive materials are used predominantly in grit sizes from about 100-400. In general in the prior art the total grinding performance of a tool containing superabrasive grits has been found to correlate closely with the volume fraction of superabrasive grit in the tool, although a certain amount of porosity in a grinding wheel containing superabrasive is usually desirable. Conventional abrasives have been used together with superabrasives in abrasive tools in the prior art, but the conventional abrasive in such products has functioned primarily as a kind of filler and has contributed little if anything as an abrasive to the total cutting tool life when the tool was used on hard workpieces such as tool steels. For example, U.S. Pat. No. 4,652,277 of Mar. 24, 1987 to Makhlouf et al. refers to the use of silicon carbide and alumina to help make the coefficients of thermal expansion of the rim and core regions as close to each other as possible in a grinding wheel containing CBN in the rim region only, but there is no suggestion that these conventional abrasive materials contribute directly as abrasives to the cutting performance of the wheel.

SUMMARY OF THE INVENTION

It has been found that the grinding effectiveness of bonded abrasive tools containing a given volume fraction of superabrasives can be substantially enhanced in many applications by using a particular type of sintered aluminous abrasive grits along with the superabrasive. Aluminous abrasive grits suitable for this invention are denoted herein as "microcrystalline alumina" or "MCA". These abrasives may be made, for instance, by sol gel processes described in U.S. Pat. Nos. 4,623,364 and 4,314,827. The preferred process is that of the former patent wherein very fine "seeds" are added to the sol, the amount of seed material not exceeding 5% by weight, and preferably not more than 2% by weight of the total alumina in the final product. The seeding results in a much finer crystal structure than the process of U.S. Pat. No. 4,314,827 which does not employ seeds and the seeded product produces abrasive grits which are higher in density and harder. The MCA may be present in the wheel formulation to the amount of about 47% by volume of the wheel to as little as about 10% by volume of the wheel composition. Obviously the greater the amount of MCA present, the greater the cost savings.

Microcrystalline alumina for use in this invention is preferably characterized by a microstructure, as revealed by examination of conventionally prepared cross sections under magnification of 5,000–20,000 X by light or electron microscopy, that predominantly comprises tightly packed, very fine crystals of alpha alumina or of an aluminum spinel such as magnesium aluminate. The predominant crystallites have maximum dimensions of no more than about 1 micron, preferably no more than about 0.7 microns, and still more preferably no more than about 0.3 micron. The predominant crystallites generally show little or no regular faceting at about 5,000 magnification and are approximately equiaxed, with no higher aspect ratio than 2, usually less than 1.5.

In addition to the predominant types of fine crystallites as described above, MCA for use in this invention can contain up to about forty volume percent of other materials, such as coarse alumina lath shaped crystals believed to be formed by growth of some of the predominant finer crystallites, or a spinel matrix with poorly defined grain boundaries.

The MCA abrasive grits for use in this invention preferably have a density of at least 90%, more preferably at least 95% of the theoretical density corresponding to their chemical analysis and preferably have a hardness of at least 16, more preferably of at least 18, still more preferably at least 19 gigapascals.

DESCRIPTION OF THE PREFERRED EMBODIMENTS

MCA for use in this invention may be made by a variety of processes, preferably those processes described and claimed in U. S. Pat. Nos. 4,623,364; 4,314,827; and 4,744,802 which are hereby incorporated by reference. The grits made according to the first and third patents are made by mixing very fine crystalline seed particles with sols or gels containing hydrated forms of alumina, such as boehmite, and optionally also containing materials such as magnesia that can form spinels with part of the alumina content, then drying the seeded sol or gel and heating the dried seeded gel to an appropriate temperature for an appropriate time to generate the desired microstructure. The microstructure of the abrasive grits is preferably non-cellular. Sizing to abrasive grits can be accomplished before or after final heating, with the former preferred because it is easier.

Any effective seed material, such as ferric oxide, may be used as an alternative to the alpha alumina seeds taught explicitly by U.S. Pat. No. 4,623,364, and any form of hydrated 5 alumina sol or gel may be seeded, although the sols and seeds taught by Cottringer are generally preferred. Preferably, when the preferred materials taught by Cottringer are used, the seeds are as fine as practically obtainable, and the total amount of seeds does not exceed 5%, or more preferably does not exceed 2%, by weight of the total alumina in the final product.

The finely microcrystalline aluminous grits and the superabrasive grits used together according to this invention generally are mixed together with conventional bond ingredients, optionally including porosity formers, pressed into appropriate shapes, and heated to form grinding tools of approximately uniform composition throughout, all according to methods and practices conventional in the bonded abrasives arts. Bonds of any of the general types common in the art, such as glass or vitrified, resinoid, or metal may be used effectively, as well as hybrid bonds such as metal filled resinoid bonds and resin impregnated vitrified bonds. All the known fillers, active and non-active, are part of the present invention, e.g. teflon, graphite, and silver in superabrasive wheels as well as potassium sulfate, cryolite, kyanite, etc. Alternatively, the mixed grits characteristic of this invention can be concentrated in the outer parts of a grinding tool, for example by entrapping the grits in metal accreted on a supporting surface by electroplating or by placing the mixed grits around the periphery of a brazing type metal alloy and then partially softening or melting the alloy in a vacuum furnace so that the grits sink into the alloy sufficiently to hold them in place when the tool is later cooled. This again is a conventional manufacturing technique adapted to the uses of this invention, and generally any conventional type or shape of bonded abrasive tool known in the prior art and utilizing a substantial amount of superabrasive grits can be made advantageously in an otherwise conventional manner by replacing part of the superabrasive grits with finely microcrystalline aluminous grits according to this invention.

The practice and value of the invention may be further appreciated from the following non-limiting examples.

DESCRIPTION OF THE PREFERRED EMBODIMENTS

Examples 1–5 and Comparative Examples C1–C6

These examples describe grinding wheels made with a specific type of vitrified bond having the composition shown in Table 1.

TABLE 1

| Composition of Vitrified Bond I | | | | | | | | |
|---|---|---|---|---|---|---|---|---|
| Oxide Formula: | Na$_2$O | K$_2$O | MgO | CaO | SiO$_2$ | Al$_2$O$_3$ | B$_2$O$_3$ | Fe$_2$O$_3$ | TiO$_2$ |
| No. of Moles: | 0.47 | 0.07 | 0.25 | 0.21 | 3.77 | 0.58 | 0.65 | 0.01 | 0.03 |

After conventional mixing of ingredients, the pressed green wheels were heated in a kiln to 1100° C. at a rate of 60° C. per hour, held at 1100° C. for 6 hours, and then allowed to cool in the unopened kiln with no additional heat input until the kiln reached room temperature. Three types of abrasive grain were used: conventional monocrystalline CBN sourced from General Electric Company, denoted in the table below as CBN; microcrystalline aluminous abrasive manufactured by Norton Company of Worcester, Mass. and designated as SG, denoted in the table below as MCA; and a high purity fused alumina abrasive, type 32A from Norton Company, Worcester, Mass., denoted in the table below as 32A. All the abrasives used were graded to grit 150 or grit 180 according to the standards of ANSI. The grinding wheels made for these examples were about 19 mm in outside diameter with central mounting holes about 6.35 mm in diameter and about 15.9 mm thick. The specific compositions of the wheels are shown in Table 2.

TABLE 2

Compositions of Grinding Wheels for Examples 1–5 and Comparative Examples C1–C6

| Example No. | Volume Percents of: | | | | Note |
|---|---|---|---|---|---|
| | Porosity | CBN | MCA | 32A | |
| C1 | 37 | 0 | 0 | 48 | |
| C2 | 38 | 0 | 48 | 0 | |
| C3 | 38 | 0 | 48 | * | |
| 1 | 38 | 3 | 45 | 0 | |
| 2 | 38 | 6 | 42 | 0 | |
| 3 | 38 | 9 | 39 | 0 | |
| 4 | 25 | 25 | 23 | 0 | * |
| C4 | 25 | 25 | 0 | 23 | * |
| 5 | 25 | 37.5 | 9.5 | 0 | * |
| C5 | 25 | 37.5 | 0 | 9.5 | * |
| C6 | 25 | 50 | 0 | 0 | * |

*A conventional mullite filler was used in the bond for these wheels.

The wheels with compositions shown in Table 2 were tested in grinding workpieces having the form of discs about 70 mm in outside diameter with a center hole about 25.4 mm in diameter and a thickness of about 9.5 mm. In a type of test briefly denoted herein as "ID Grinding", the inside diameters of such discs were ground with wheels moving at 10,000 surface feet per minute and infeed rates set at a specific volume of metal removal per minute, either 2.46 cm$^3$/min ("low") or 5.74 cm$^3$/min ("high"), assuming no wheel wear. The wheels dressed periodically during grinding in a conventional manner with a rotary diamond tool. The grinding wheels and the workpieces were cooled during grinding by a liberal flow of a conventional oil (White and Bagley type 1572), and the wheels were powered during use by a conventional grinding machine (Bryant Model 263). Results of the grinding tests when the workpieces were made of A.I.S.I. Type 52100 tool steel, hardened to Rockwell C 60 hardness, are shown in Table 3. "G ratio" is the ratio of the volume of metal removed by grinding to the volume of wheel worn away by the same amount of grinding. The relative G Ratio and Power Draw figures shown are obtained by arbitrarily equating the values for wheel C1 to 100 and adjusting the other values to give an appropriate ratio to this value for wheel C1.

TABLE 3

Results of Grinding Test on Hardened 52100 Steel with Wheels from Examples 1–5 and Comparative Examples C1–C6

| Wheel Type No. | Workpiece Metal Removal Rate | | G Ratios | | Relative Power Draw | Volume % CBN |
|---|---|---|---|---|---|---|
| | Nominal | Actual, Cm$^3$/Min | Absolute | Relative | | |
| C1 | Low | 2.38 | 1166 | 100 | 100 | 0 |

TABLE 3-continued

Results of Grinding Test on Hardened 52100 Steel
with Wheels from Examples 1-5 and
Comparative Examples C1-C6

| Wheel Type No. | Workpiece Metal Removal Rate Nominal | Actual, Cm³/Min | G Ratios Absolute | G Ratios Relative | Relative Power Draw | Volume % CBN |
|---|---|---|---|---|---|---|
|  | High | 5.42 | 426 | 100 | 100 |  |
| C2 | Low | 2.29 | 1250 | 107 | 164 | 0 |
|  | High | 5.42 | 1688 | 396 | 147 |  |
| C3 | Low | 2.16 | 1981 | 170 | 211 | 0 |
|  | High | 5.19 | 608 | 143 | 168 |  |
| 1 | Low | 2.29 | 4000 | 342 | 198 | 3 |
|  | High | 5.01 | 4266 | 1000 | 209 |  |
| 2 | Low | 2.29 | 6829 | 586 | 146 | 6 |
|  | High | 5.11 | 11,452 | 2688 | 172 |  |
| 3 | Low | 2.28 | 8622 | 739 | 129 | 9 |
|  | High | 5.29 | 8673 | 2035 | 137 |  |
| 4 | Low | 2.39 | 4221 | 362 | 96 | 25 |
|  | High | 5.34 | 4241 | 995 | 129 |  |
| C4 | Low | 2.43 | 4802 | 412 | 60 | 25 |
| 5 | Low | 2.34 | 8522 | 731 | 86 | 37.5 |
|  | High | 5.49 | 4845 | 1137 | 111 |  |
| C5 | Low | 2 39 | 16,890 | 1448 | 79 | 37.5 |
|  | High | 5.52 | 11,359 | 2666 | 168 |  |
| C6 | Low | 2.34 | 11,329 | 972 | 93 | 50 |
|  | High | 5.46 | 11,234 | 2637 | 11 |  |

These results show that wheel type 2, with only 6% CBN mixed with microcrystalline aluminous abrasive, has about the same G ratio and power draw as prior art type C5, with more than ten times as much expensive CBN grain, and is significantly better in G ratio than any other wheel tested, without drawing so much power as to vitiate its G ratio advantage. At the lower infeed rate, wheel type 3 gives higher G ratio than any other tested wheel with less than 37.5% CBN, without excessive power draw, and thus has significant economic advantage. Even as little as 3% CBN makes a wheel perform significantly better than any tested wheel without any CBN.

Comparative Examples C8–C9

Comparative examples C8 and C9 were made and tested as described above for Examples 1, 2, and 3 respectively, except that the MCA grits were substituted by 32A grits. These wheels had less than one tenth the grinding efficiency of wheel types 1, 2, and 3.

Example 6 and Comparative Examples 7-9

Grinding wheel type 6 was made with the same composition as type 3 but the pressed green wheel was heated to a maximum of 930° C. rather than 1100° C. Comparative example C7 was made with 25 volume % CBN, 25% by volume porosity and 23% by volume of 150 grit fused alumina and was heated to a maximum of 930° C., but was otherwise like type C4. Comparative examples C8 and C9 were like C7 except that the CBN abrasive was substituted by all MCA abrasive for C8 and by all 32A abrasive for C9. All four types of these compositions were made into wheels with diameters of 127 mm for tests grinding outside diameters and into wheels with diameters of 76.2 mm for grinding inside diameters. Grinding test conditions were the same as for the previously described examples, except that workpieces of Inconel 718 and of A.I.S.I. type M7 tool steel were ground as well as those of A.I.S.I. 52100 as used previously, and both outside and inside diameters of the workpieces were ground at a variety of metal removal rates. Representative data from these tests are given in Table 4 for grinding in oil (White and Bagley 1572) and in Table 5 for grinding in a mixture of water and water soluble oil.

TABLE 4

Grinding Performance of Types 6 and C7–C9 in Oil When Grinding

| Wheel Type No. | Inconel 718 G Ratio | RMR | A.I.S.I. 5210 G Ratio | RMR | A.I.S.I. M7 G Ratio | RMR |
|---|---|---|---|---|---|---|
| Grinding Inside Diameters |  |  |  |  |  |  |
| C7 | 1600 | 1 | 3000–4500 | 4–6 | 1500 | 6 |
| 6 | 800 | 1 | 2250 | 4 | 1050 | 3 |
| C8 | 150 | 1 | 300 | 8 | 90 | 6 |
| C9 | 50 | 1 | 150 | 4 | 30 | 3 |
| Grinding Outside Diameters |  |  |  |  |  |  |
| C7 | 2130 | 1 | 2000–3200 | 1 | 1000 | 2 |
| 6 | 270 | 1 | 2000–3200 | 1 | 600 | 1 |
| C8 | 90 | 1 | 320 | 8 | 100 | 3 |
| C9 | 30 | 1 | 80 | 2 | 20 | 1 |

Note:
RMR = relative metal removal rate.

In general in tests of the type shown in Tables 4 and 5, G ratio will decrease with increasing metal removal rate. Where a range is given in the tables for both metal removal rate and the corresponding G ratio, it should be understood that the highest G ratio will normally correspond to the lowest metal removal rate. Where a range is given in the G ratio only, it indicates that actual results were highly variable. This variability may be due to variations in the lots of metal tested, or to unknown factors.

Table 4 shows that the wheels according to this invention are essentially equivalent in performance to the wheels with nearly three times as much of the expensive superabrasive in grinding the outside diameters of 52100 material and are economically advantageous in comparison with the concentrated superabrasive wheels in all the tests shown, except probably for the outside diameters of Inconel. The wheels according to this invention are highly superior to the tested prior art wheels without any superabrasive.

TABLE 5
Grinding Performance of Types 6 and C7–C9 in Water Soluble Oil

| Wheel Type No. | When Grinding | | | | | |
|---|---|---|---|---|---|---|
| | Inconel 718 | | A.I.S.I. 5210 | | A.I.S.I. M7 | |
| | G Ratio | RMR | G Ratio | RMR | G Ratio | RMR |
| Grinding Inside Diameters | | | | | | |
| C7 | 40 | 0.2 | 400–1200 | 1–1.5 | 200–700 | 0.4–1 |
| 6 | 12 | 0.15 | 300 | 0.6 | 70 | 0.25 |
| C8 | 8 | 0.3 | 120 | 1.0 | 12 | 1.0 |
| C9 | 8 | 0.3 | 80 | 0.6 | 8 | 0.6 |
| Grinding Outside Diameters | | | | | | |
| C7 | 30 | 0.15 | 1000 | 0.6 | 150 | 0.4 |
| 6 | 5 | 0.1 | 150 | 0.4 | 25 | 0.15 |
| C8 | 7 | 0.6 | 60 | 2.0 | 10 | 0.8 |
| C9 | 5 | 0.6 | 25 | 1.0 | 6 | 0.6 |

Note:
RMR = relative metal removal rate.

The data in Table 5 show that the relative performance of the grinding wheels according to this invention is not as good with water soluble oil coolant as with straight oil coolant. Even so, the wheels according to this invention can be economically advantageous compared with wheels having no superabrasive.

Examples 7–8 and Comparative Examples C10–C11

These examples illustrate the application of the invention to grinding tools in which the grits are concentrated on the outside in essentially a single layer. In these particular cases, the bond was a brazing alloy and was applied as follows:

(1) Clean and sandblast preform, which is typically steel.

(2) Apply layer of brazing paste onto preform. Braze layer thickness varies as a function of grit size, concentration, and grit exposure.

(3) Sprinkle abrasive particles onto brazing paste.

(4) Place part into vacuum furnace, 1x10-4 torr minimum.

(5) Heat part to brazing temperature, corresponding to the brazing paste applied.

(6) Cool part down in vacuum.

Part is complete except for cosmetic operations.

The brazing paste was a commercially available AWS BVAg-8b alloy modified to bond difficult to wet materials, such as, ceramic, diamond, CBN, etc.

All the types of grinding tools for these examples had the same volume percent total abrasive grits in the effective outer layers. The grits were all CBN for type C10, half CBN-half 38A for type C11, half CBN-half MCA for type 7, and three-quarters CBN-one-quarter MCA for type 8. The concentration of abrasive used in the SG/CBN tests are expressed as 100%. This means the highest density achievable by the sprinkling method. Physically this correlates to about 75% of the abrasive sections surface area being covered with abrasive, or in the case of 80 grit, approximately 1.4 ct/in. sq.

In the products of these examples, the grits protrude from the surface of the finished tool considerably more than in the grinding wheels described in all the proceeding examples. This causes products of this type to have rapid initial cut and correspondingly rapid initial tool wear, and makes it very difficult to determine grinding tool volume losses accurately. The method of measuring performance was therefore changed for these examples: the change in wheel radius rather than volume was measured, along with the volume of metal removed. Results are shown for one representative type of test conditions in Table 6.

TABLE 6
Comparison of Grinding Tool Wear and Volume of Metal Removed, Examples 7–8 and C10–C11

| Relative Cumulative Metal Volume Cut | Cumulative Tool Diameter Loss, Mm, for: | | | |
|---|---|---|---|---|
| | 7 | 8 | C10 | C11 |
| 3 | 0.101 | 0.101 | 0.096 | 0.123 |
| 4 | 0.104 | 0.140 | 0.103 | 0.182 |
| 6 | 0.121 | 0.173 | 0.121 | 0.177 |
| 9 | 0.127 | 0.203 | 0.127 | 0.208 |

Table 6 shows that Types 7 and C10 are almost exactly comparable, while the others are inferior. Because Type 7 has only half as much superabrasive as Type C10, type 7 is clearly more economical.

Example 9 and Comparative Example C12

These examples illustrate the invention in grinding tools with resinoid bonds and testing in dry grinding. Comparative Example C12 had 25 volume % of nickel coated CBN grits (designated below as "CB", for "coated borazon"), while Example 9 had the same amount of CBN but also 4.75 volume % of grit 100 MCA. The green state bond for both wheels consisted of:

| | |
|---|---|
| CBN + abrasive coating + sodium hexafluorosilicate | 47.0 vol % |
| Long flow phenolic resin + lime | 36.7 vol % |
| Liquid furfural | 2.3 vol % |
| Flake silver | 14.0 vol % |

The abrasive grits and the bond were mixed in a conventional manner for the manufacture of bonded abrasives, then loaded into steel molds and molded at about 160.C at a pressure of about 40 megapascals for about 30 minutes to produce a final grinding wheel.

The wheels were tested at 3600 SFPM in grinding a workpiece of A.I.S.I. type M-2 steel, hardened to Rockwell C 65, at five different fixed infeed dimensions as shown in Table 7.

TABLE 7
Relative G Ratios and Power Draws for Types 9 and C12

| Infeed Depth, mm | 0.025 | 0.076 | 0.127 | 0.178 |
|---|---|---|---|---|
| G Ratio of Type 9/ G Ratio of Type C12 | 1.39 | 1.37 | 1.44 | 1.47 |
| Power Draw of Type 9/ Power Draw of Type C12 | 1.21 | 1.20 | 1.11 | 1.05 |

Inasmuch as the ratio of G Ratios for the two types of wheels is always higher than the ratios of power draw rates, the wheel according to this invention has an operating advantage that increases with increasing infeed depth.

Examples 10–11

These examples show that the type of vitrified bond used can have a significant effect on the performance of grinding wheels according to this invention.

Vitrified bonded wheels measuring 127 mm in diameter and 16 mm thick with a 22 mm diameter center hole were manufactured in the conventional manner. One set of wheels, designated as Type 10, was bonded with a commercially available frit designated as Type 3GF259A and available from 0. Hommel Co., Pittsburgh, Pa. and was fired at 900° C. to mature the bond; the other set of wheels, identified as Type 11, was bonded with a commercial bond available from Norton Company of Worcester, Mass., designated as HA4, and these wheels were also fired at 900° C. The wheels were straight rim type wheels widely used for many grinding operations where the abrasive is diamond or CBN. The rim or grinding section of the wheels were made from the following mix composition and resulted in the indicated finished volume percent composition.

| Material | Wheel Type 10 | | Wheel Type 11 | |
|---|---|---|---|---|
| | Finished Vol. % | Mix Formula | Finished Vol. % | Mix Formula |
| CBN | 9 | 8.2 g (140/170 grit) | 9 | 8.19 (140/170 grit) |
| MCA Abrasive, as in U.S. Pat. No. 4,623,364 - 150 grit | 39 | 39.6 g | 39 | 39.96 g |
| O. Hommel frit | 27 | 16.9 g | | |
| HA4 bond | | | 14.61 | 10.56 g |
| Water | | 4.83 g | | |
| Glycerine | | 0.54 g | | |
| Methyl cellulose | | 0.13 g | | |
| Dextrin | | | | 0.21 g |
| Aeromer 30 | | | | 2.08 g |
| Pores | 25 | | 37.39 | |

The core of the wheels had the following mix composition and finished volume percent composition:

| Material | Wheel Type 10 | | Wheel Type 11 | |
|---|---|---|---|---|
| | Finished Vol. % | Mix Formula | Finished Vol. % | Mix Formula |
| 38A, grit 150 | 44.8 | 342.78 g | 39 | 298.97 g |
| SiC, grit 150 | | | 9 | 56.32 g |
| O. Hommel frit | 25.2 | 118.05 g | | |
| HA4 bond | | | 14.61 | 79.00 g |
| Water | | 28.04 g | | |
| Glycerine | | 3.16 g | | |
| Methyl cellulose | | 0.74 g | | |
| Dextrin | | | | 1.56 g |
| Aeromer 30 | | | | 15.31 g |
| Pores | 30 | | 37.39 | |

The finished wheels were tested grinding 52100 steel using a coolant made up of water and a water soluble oil at 10:1 water to oil. Wheel 10 had almost twice the G ratio of wheel 11 and drew slightly less power during grinding. It should be noted that the grinding portion of Wheel 10 contained 25% by volume of pores and wheel 11 37.39%. The fritted bonds are inherently softer acting in grinding therefore so as to not bias the grinding results, more bond was added to Wheel 10 so that both wheels had about the same degree of actual hardness.

Example 12 and Comparative Example C12

These examples illustrate the use of the invention in metal bonded wheels without exceptionally protruding abrasive grits in the outer section. Example 12 used both CBN and MCA abrasive grits in a volume ratio of 3:1, while Comparative Example C12 had the same total volume of all CBN grits. The bond composition was 81.4% copper and 18.6% tin, and the wheels were made by mixing copper and tin powders with a wetting agent, then adding the abrasive grits and mixing again, pressing cold around a core at a pressure of about 330 megapascals to form a green wheel, and sintering the green wheel in a mixed nitrogen and hydrogen atmosphere to a final temperature of about 550.C over a period of five hours to reach final temperature and three hours at final temperature. All the wheel making procedures, except for the use of mixed types of abrasive grits, were conventional in the art. In an average of two tests under the same conditions with each type of wheel, Type 12 had a G Ratio 17% higher than Type C12, while drawing about 10% less power. Type 12 is therefore preferable.

Example 13 and Comparative Example C13

These examples illustrate the use of the invention with resinoid bond wheels for grinding of steel while cooling with oil. Example 13 was like Example 9, except that the total amount of abrasive grit was 25 volume %, of which one quarter was MCA grits and the balance CB. Wheels of Type 13 were compared against wheels of Type C12 in grinding A.I.S.I. Type M-2 steel, hardened to Rockwell C 65 hardness while cooling with oil at a low infeed rate. Type 13 had a G Ratio 45% higher than Type C12, while drawing slightly less power.

Examples 14 and 15

These examples are closely related to Example 9. The materials used are the same as in that Example, except that the MCA abrasive used was coated with nickel, by conventional electroless nickel plating, to give a thickness of coating corresponding to 54% of the weight of the coated abrasive grit. Except for this change, Example 14 was like Example 9, while Example 15 was like Example 14, except that the amounts of abrasive grit used provided 6.25 volume % MCA and 18.75 volume % CB. The relative performance of wheels of these types in dry grinding of the same steel as shown under Example 9 is shown in Table 8.

TABLE 8
Relative G Ratios and Power Draws for Types 14, 15, and C12

| Infeed Depth, mm | 0.076 | 0.127 | 0.178 |
|---|---|---|---|
| G Ratio of Type 14/ G Ratio of Type C12 | 1.30 | 1.60 | 2.58 |
| G Ratio of Type 15/ G Ratio of Type C12 | 1.30 | 1.79 | 2.23 |
| Power Draw of Type 14/ Power Draw of Type C12 | 1.24 | 1.22 | 1.16 |
| Power Draw of Type 14/ Power Draw of Type C12 | 1.12 | 1.04 | 0.99 |

Comparison of the data in Table 8 with that in Table 7 shows that the advantage of this invention in this bond material is even more marked when the MCA grits are nickel coated. Wheels of types 14 and 15 were also tested in the same type of grinding test, except for the use of water soluble oil to cool the workpiece during grinding. The G ratio advantages of types 14 and 15 compared with type C12 was considerably reduced from the level shown in Table 8, but did not disappear entirely.

What is claimed is:

1. A bonded abrasive tool comprising generally discrete, size graded abrasive grits held in a matrix of a bond material chemically distinct from said abrasive grits, wherein said grits are a mixture of superabrasive grits and aluminous grits, said aluminous grits consisting predominantly of approximately equiaxed alpha alumina or alumina spinel microcrystallites having a maximum dimension of no more than about one micron that have been nickel coated before being bonded into the tool.

2. A bonded abrasive tool according to claim 1 wherein the micros crystallites have a maximum dimension of no more than about 0.7 micron.

3. A bonded abrasive tool according to claim 11 wherein the microcrystallites have a maximum dimension of no more than about 0.3 micron.

4. A bonded abrasive tool according to claim 1 wherein the aluminous grist are non-cellular.

5. A bonded abrasive tool according to claim 1 wherein the aluminous grist have a hardness of at least 18 gigapascals.

6. A bonded abrasive tool according to claim 1 wherein said bond material is a glass consisting essentially of metal oxides.

7. A bonded abrasive tool according to claim 1 in which the bond material is a cured product of a phenolic resin.

8. A bonded abrasive tool according to claim 1 wherein said aluminous grits are made by a process comprising the steps of:
 (a) mixing a sol or gel of hydrated alumina submicron crystalline seed particles effective to facilitate the conversion of hydrated alumina to crystalline alpha alumina upon heating;
 (b) drying the mixture formed in step (a);
 (c) heating the dried mixture formed in step (b) at temperatures below 1500° C. for a sufficient time to convert the alumina or an aluminum spinel; and
 (d) selecting from the product of step (c) appropriately size graded abrasive grits.

9. A bonded abrasive tool comprising generally discrete, size graded abrasive grits held in a matrix of a bond material chemically distinct from said abrasive grits, wherein the grits comprise both superabrasive grits and aluminous grits, said superabrasive grits representing not more than 9% of the volume of the bonded adhesive tool and said aluminous grits consisting predominantly of approximately equiaxed alpha sol gel aluminous abrasive microcrystallites having a maximum dimension of no more than about one micron.

10. A bonded abrasive tool as recited in claim 9, wherein the bond material is selected from the class consisting of resin, vitreous and metal.

11. A bonded tool as recited in claim 9, wherein the aluminous abrasive is seeded sol gel.

12. A bonded abrasive tool as recited in claim 9, wherein the aluminous grist are non-cellular.

13. A bonded abrasive tool as recited in claim 9, wherein said aluminous grits have a hardness of at least 18 gigapascals.

14. A bonded abrasive tool as recited in claim 9, wherein the superabrasive grits are selected from the class consisting of cubic boron nitride and diamond.

15. A bonded abrasive tool as recited in claim 9, wherein the ratio of aluminous grits to superabrasive grits is 10 to 1.

16. A bonded abrasive tool comprising generally discrete, size graded abrasive grits held in a matrix of a bond material chemically distinct from said abrasive grits, wherein the improvement comprises the presence in the tool of 6% by volume of superabrasive grits and 42% by volume of aluminous grist that consist predominantly of approximately equiaxed alpha sol gel aluminous abrasive microcrystallites having a maximum dimension of no more than about one micron.

17. An abrasive tool comprising generally discrete, size graded abrasive grist held in a substantially single layer and bonded to a substrate by a metal matrix, wherein the layer comprises both superabrasive grist and aluminous grits, said superabrasive grits providing not more than 9% of the total volume of the tool and said aluminous grits consisting predominantly of approximately equiaxed alpha sol gel aluminous abrasive microcrystallites having a maximum dimension of no more than about one microns.

18. A bonded abrasive tool according to claim 1 in which the bond material is a metal.

19. A bonded abrasive tool according to claim 1 in which the volume of the superabrasive is not more than 9% of the total volume of the tool.

* * * * *